United States Patent [19]

Benedikt et al.

[11] Patent Number: 5,353,633
[45] Date of Patent: Oct. 11, 1994

[54] PRESSURE SENSOR FOR DETECTING THE PRESSURE IN COMBUSTION CHAMBER OF COMBUSTION ENGINE

[75] Inventors: Walter Benedikt, Kornwestheim; Manfred Vogel, Ditzingen; Werner Herden, Gerlingen; Johann Konrad, Tamm; Wolfgang Schmidt, Vaihingen/Enz; Josef Tosch, Schwieberdingen; Matthias Küsell, Korntal-Münchingen, all of Fed. Rep. of Germany

[73] Assignee: Robert Bosch GmbH, Stuttgart, Fed. Rep. of Germany

[21] Appl. No.: 773,902

[22] PCT Filed: Feb. 27, 1991

[86] PCT No.: PCT/DE91/00161
§ 371 Date: Oct. 29, 1991
§ 102(e) Date: Oct. 29, 1991

[87] PCT Pub. No.: WO91/14929
PCT Pub. Date: Oct. 3, 1991

[30] Foreign Application Priority Data

Mar. 23, 1990 [DE] Fed. Rep. of Germany ....... 4009377

[51] Int. Cl.$^5$ ............................................ G01M 15/00
[52] U.S. Cl. ..................................................... 73/115
[58] Field of Search .................... 310/338; 73/115, 723, 73/725–727, 708, 717

[56] References Cited

U.S. PATENT DOCUMENTS

| | | | |
|---|---|---|---|
| 2,096,826 | 10/1937 | Schrader | 310/338 |
| 4,567,395 | 1/1986 | Pundasika | 73/115 |
| 4,586,018 | 4/1986 | Bettman | 73/115 |
| 4,620,438 | 11/1986 | Howng | 73/115 |
| 4,838,089 | 6/1989 | Okada et al. | 73/115 |
| 5,062,294 | 11/1991 | Iwata | 73/115 |
| 5,095,741 | 3/1992 | Bartig et al. | 73/115 |
| 5,126,617 | 6/1992 | Lukasiewicz et al. | 310/338 |

FOREIGN PATENT DOCUMENTS 3811311 3/1989 Fed. Rep. of Germany .

Primary Examiner—Robert Raevis
Attorney, Agent, or Firm—Michael J. Striker

[57] ABSTRACT

A pressure sensor for detecting pressure in a combustion chamber of an internal combustion engine, particularly of a motor vehicle, has a housing, a sensor block arranged in the housing, at least one plunger arranged in the housing, at least one abutment arranged in the housing, a diaphragm closing the housing and contacting the plunger, an electrical evaluating circuit arranged in the housing and including electrical components, and a ceramic plate arranged in the housing so that the sensor block and the electronic components of the evaluating circuit are arranged in the ceramic plate and the ceramic plate at least partially contacts the abutment, and the electrical components of the evaluating circuit being located at a side of the plate which faces the diaphragm.

11 Claims, 1 Drawing Sheet

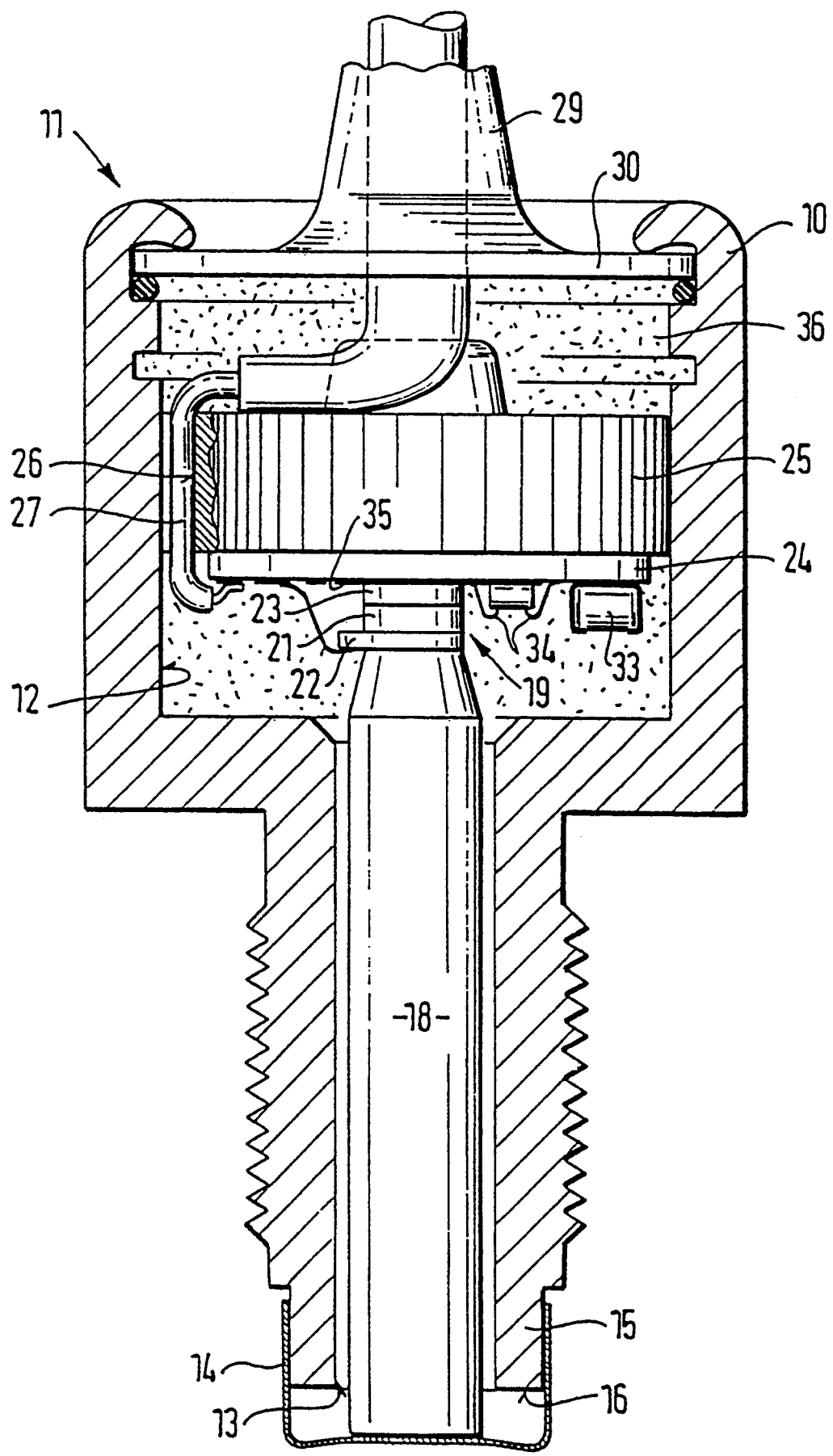

PRESSURE SENSOR FOR DETECTING THE PRESSURE IN COMBUSTION CHAMBER OF COMBUSTION ENGINE

BACKGROUND OF THE INVENTION

The present invention relates to a pressure sensor. More particularly, the present invention relates to a pressure sensor for detecting pressure in a combustion chamber in an internal combustion engine, more particularly in a motor vehicle, in which there is a sensor with a piezoelectrically acting work material, an electrically conducting contact disc, a plunger, an abutment, a diaphragm closing a housing and contacting the plunger and an electrical evaluating circuit in the housing. In such a pressure sensor, which is known from U.S. Pat. No. 4,620,438, the electronic components are arranged on a ceramic plate which is fastened after the abutment in the housing in the longitudinal direction of the pressure sensor. The piezoelectric elements are located on the other side of the abutment. The piezoelectric elements and the electronic components must accordingly be connected with one another in an expensive manner by means of insulated filaments. The overall size of the pressure sensor is accordingly additionally lengthened.

SUMMARY OF THE INVENTION

Accordingly, it is an object of the present invention to provide a pressure sensor of the above mentioned general type which avoids the disadvantages of the prior art.

In keeping with these objects and with other which will become apparent hereinafter, one feature of the present invention resides, briefly stated, in that the sensor block and the electrical components of the evaluating circuit are arranged on a ceramic plate which at least partially contacts the abutment, and the components are located on the side of the plate facing the diaphragm.

When the pressure sensor is designed in accordance with the present invention, it has the advantage over the prior art that the electronic components, the piezoelectric element or elements and the plunger located between the piezoelectric elements and the diaphragm are located on a single ceramic plate, a hybrid. Accordingly, simple standard bond techniques which have been proven in practice can be used for connecting the electronic components and the piezoelectric elements. The entire hybrid, including the electronic components and the piezoelectric elements, can be tested already before installation in the sensor housing. Accordingly, a simple assembly of the pressure sensor is possible. In particular, its overall length is shortened. The pressure sensor can accordingly be produced inexpensively. Due to the spatial arrangement, particularly the arrangement on the same hybrid in immediate proximity to one another, practically the same temperature prevails at the electronic components and the piezoelectric elements. Costly steps for temperature compensation can accordingly be dispensed with. In contrast, it is possible to compensate for the systematic temperature curve of the piezoelectric ceramic materials used as piezoelectric elements by means of electronic components. Moreover, there is no conductive electrical connection between the piezoelectric element and the housing, so that a potential-free construction of the sensor is possible and the measurement signal is accordingly transmitted so as to be virtually free of errors.

In accordance with another feature of the present invention the electrical components and the contact discs of the sensor block are connected by means of wire bonds and thick-film conductor paths.

The connection surfaces between the plate, the piezoelectric work material and the contact disc can be glued.

The plate can be composed of $Al_2O_3$ and the abutment can be pressed into the housing.

In accordance with still a further feature of the present invention, the abutment can be provided with a bore hole for guiding through an electrical line of the evaluating circuit. The abutment can be provided with a flattened segment for guiding through electrical lines as well.

The plunger can be composed of glass ceramic. The housing can be sealed with a sealant in the area of the sensor block and the electronic components.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single drawing shows a section through a pressure sensor.

DESCRIPTION OF A PREFERRED EMBODIMENT

In the only drawing, the housing of a pressure sensor 11 for determining the pressure in the combustion chamber of an internal combustion engine is designated by 10. It has a central continuous stepped bore hole 12. The opening 13 of the housing 10 facing the combustion chamber is sealed by a diaphragm 14. The diaphragm 14 is constructed as a so-called cap diaphragm. The edge of the diaphragm is bent and slid over the end of the shaft 15 of the housing 10. The diaphragm 14 is accordingly fixed at the housing 10, but does not directly contact the front side 16 of the shaft 15 so as to ensure a movability of the diaphragm 14. The bent area of the diaphragm 14 can accordingly move freely. The diaphragm 14 is welded on the shaft 15 in the area of the edge. In a particularly advantageous manner, the diaphragm 14 is constructed from a super-alloy, i.e. an alloy of e.g. approximately 50% Ni, 20% Cr, 20% Fe. One end of a plunger 18 contacts the central area of the diaphragm 14, the other end contacts a sensor block 19. The plunger 18 can consist of glass ceramic and, in addition, a heat conducting foil can be situated between the sensor block 19 and the plunger 18. The sensor block 19 includes at least one piezoelectric ceramic element 21, e.g. a quartz disk, which is arranged between two electrical contact disks 22, 23 composed for example of the material Invar. The contact surfaces between the contact disks 22, 23 and the piezoelectric ceramic element 21 and the plunger 18 are glued. For example a conducting glue which is resistant to high temperatures can be used. Further, the contact disk 23 is glued on a ceramic plate 24, e.g. a $Al_2O_3$ hybrid. The plate 24 is glued on an abutment 25 which is pressed into the bore hole 12. The abutment 25 has a continuous bore hole 26.

The bore hole extends so as to be approximately parallel with the axis of the bore hole 26, and the conducting line 27 of the two contact disks is guided in the bore hole. The line 27, is fastened in a bush 29 of the cover 30 closing the bore hole 12. The measurement values are guided, via the line 27, to an evaluating circuit and control device of an internal combustion engine which are not shown. Instead of a bore hole 12, a segment for guiding through the line 27 can also be cut out of the abutment 25.

The electronic components 33, e.g. resistors, transistors, etc., are located adjacent to the sensor block 19 on the same side of the plate 24. The electronic components 33 and the contact disk 22 or 23 are connected by means of wire bonds 34 and thick-film conductor paths 35.

In order to protect against harmful environmental influences, e.g. moisture, the bore hole 12 is filled with a sealant in the area of the sensor block 19 and electronic components 33 and in the area between the abutment 25 and the cover 30.

The operation of a pressure sensor is known in general and is therefore not discussed more extensively here. The force acting on the sensor block 19 via the diaphragm 14 and the plunger 18 produces a surface charge of the piezoelectric ceramic element or the quartz element 21 brought about by a change of polarity. The surface charge is tapped as a measurement signal via the contact disks 22, 23. Since the electronic components 33 are located on the same side of the plate 24 directly in the vicinity of the sensor block 19, a measurement signal evaluation is possible immediately after obtaining the measurement signal. Only simple bond connections between the contact disk 23 and the components 33 or between the components 33 themselves are required. Because of a relatively long plunger 18, the electronic components 33 are relatively far apart and accordingly protected from temperature influences from the combustion chamber.

Further, a particularly simple assembly of the pressure sensor 11 is possible by means of the arrangement of the components 33 and the sensor block 19 on the plate 24, according to the invention. The plunger 18, sensor block 19, components 33, plate 24 and abutment 25 with the conducting lines 27 can already be assembled beforehand outside the housing 10 as a component unit. Accordingly, the components 33 and the sensor block 19 can be checked with respect to operability already outside of the housing 10 of the pressure sensor 11. Accordingly, during the final assembly, the unit which is preassembled and already checked need only be inserted .into the housing 10 from an opening of the bore hole 12 until it contacts the diaphragm 14. Since the abutment 25 is pressed into the housing 10, the unit is easily centered and fixed in the housing 10.

It will be understood that each of the elements described above, or two or more together, may also find a useful application in other types of constructions differing from the types described above.

While the invention has been illustrated and described as embodied in a pressure sensor for detecting the pressure in combustion chamber of combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A pressure sensor for detecting pressure in a combustion chamber of an internal combustion engine of a motor vehicle, comprising a housing; a sensor block arranged in said housing; at least one plunger arranged in said housing; at least one abutment arranged in said housing; a diaphragm closing said housing and contacting said plunger; an electrical evaluating circuit arranged in said housing and including electrical components; and a ceramic plate arranged in said housing so that said sensor block and said electronic components of said evaluating circuit are arranged on said ceramic plate and said ceramic plate at least partially contacts said abutment, said ceramic plate having a first side which faces toward said diaphragm and a second side which faces away of said diaphragm, said electrical components of said evaluating circuit being located at said first side of said plate which faces toward said diaphragm.

2. The pressure sensor as defined in claim 1, wherein said sensor block includes at least one piezoelectrically acting work material and at least one electrically conductive contact disc.

3. The pressure sensor as defined in claim 2; and further comprising means for connecting said electronic components of said evaluating circuit with said contact disc of said sensor block, said connecting means including wire bonds and thick-film conductor paths.

4. The pressure sensor as defined in claim 2, wherein said plate, said piezoelectric work material and said contact disc have connection surfaces connectable with one another; and further comprising means for connecting said connection surfaces with one another and including glue layers.

5. The pressure sensor as defined in claim 1, wherein said plate is composed of $Al_2O_3$.

6. The pressure sensor as defined in claim 1, wherein said abutment is arranged with a press fit in said housing.

7. The pressure sensor as defined in claim 1, wherein said abutment has a bore hole, said evaluating circuit having an electrical line extending through said bore hole.

8. The pressure sensor as defined in claim 1, wherein said abutment has a flattened segment, said evaluating circuit having an electrical line guided by said flattened segment.

9. The pressure sensor as defined in claim 1, wherein said plunger is composed of glass ceramic.

10. The pressure sensor as defined in claim 1, wherein said housing is sealed in an area of said sensor block and said electronic components of said evaluating circuit; and further comprising means for sealing said housing.

11. The pressure sensor as defined in claim 10, wherein said means for sealing includes a sealant.

* * * * *